J. H. Martin,

Harness Saddle Tree.

No. 112,061.    Patented Feb. 21, 1871.

Witnesses.    Inventor
    John H. Martin
    by

J. H. Martin,
Harness Saddle Tree.
No. 112,061. Patented Feb. 21, 1871.
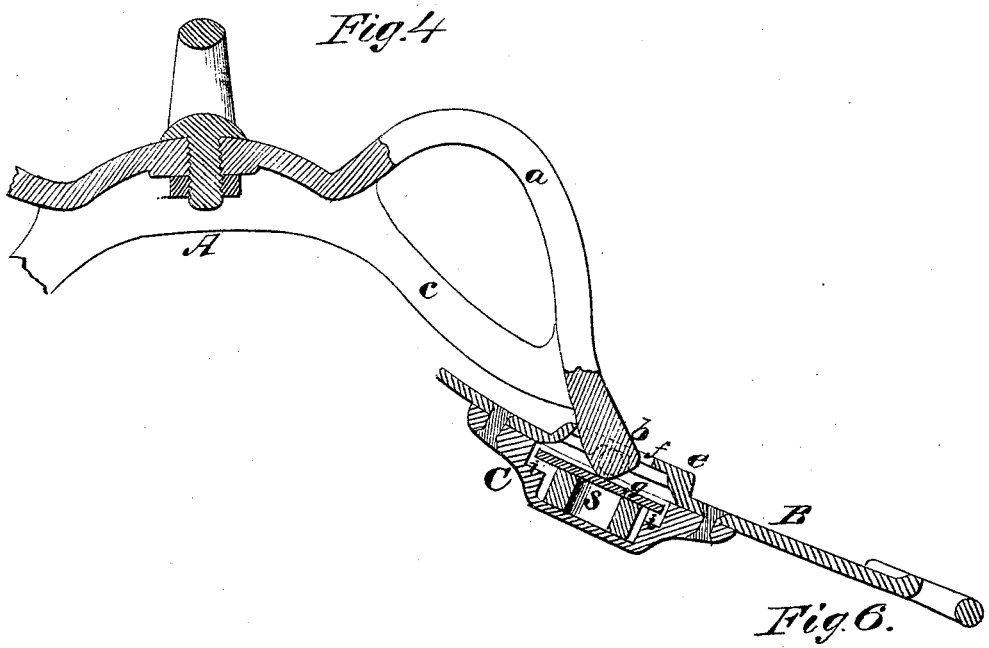
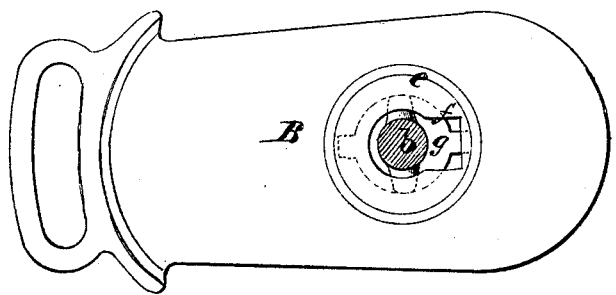
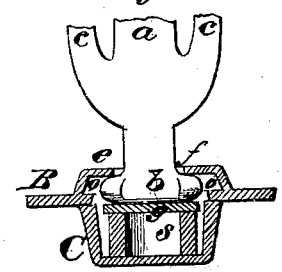
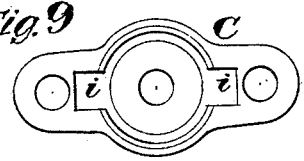
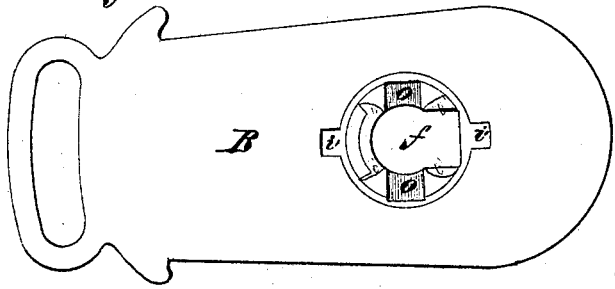
Inventor
John H. Martin
by
Munn, Fenwick & Lawrence
Witnesses

United States Patent Office.

JOHN H. MARTIN, OF COLUMBUS, OHIO.

Letters Patent No. 112,061, dated February 21, 1871.

IMPROVEMENT IN HARNESS-SADDLE TREES.

The Schedule referred to in these Letters Patent and making part of the same.

*To all whom it may concern:*

Be it known that I, JOHN H. MARTIN, of Columbus, in the county of Franklin and State of Ohio, have invented certain Improvements in Harness-Trees; and I do hereby declare that the following is a full, clear, and exact description thereof, reference being had to the accompanying drawing making part of this specification, in which—

Figure 1:
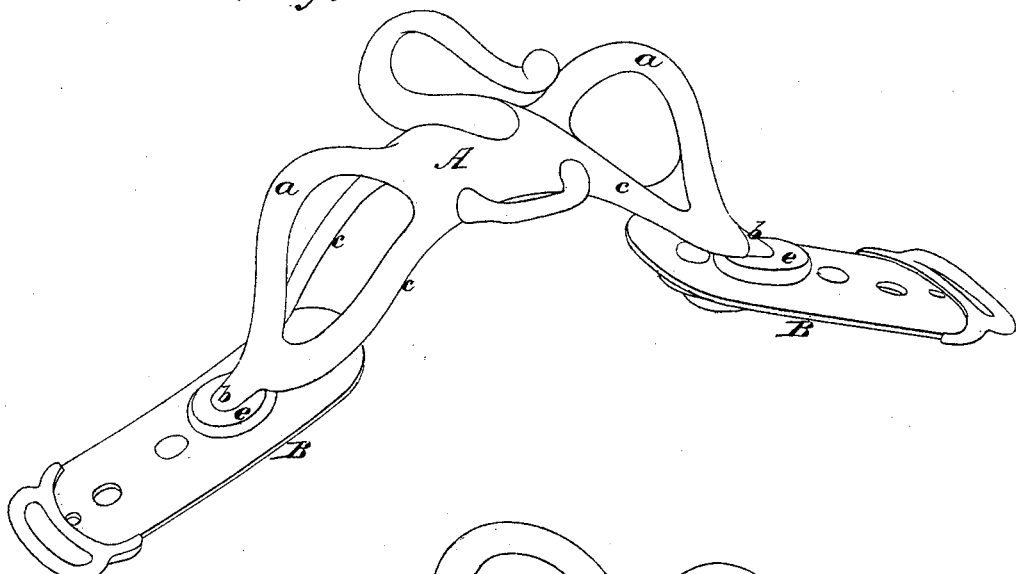

Figure 1, plate 1, is a perspective view of the improved tree and pads.

Figure 2:
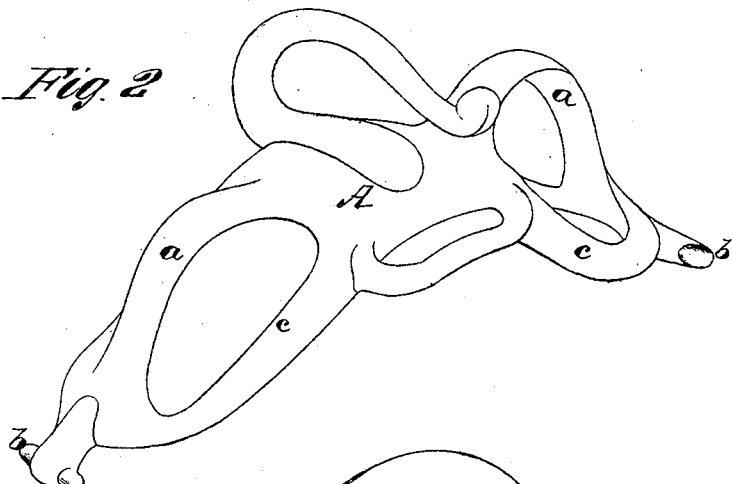

Figure 2, plate 1, is a perspective view of the tree without the pads.

Figure 3:
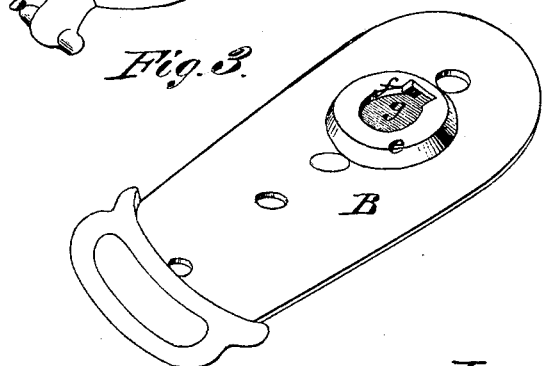

Figure 3, plate 1, is a perspective view of a pad detached from the tree.

Figures 4, 5, 6, 7, 8, and 9, are views showing more particularly the construction of the tree and pads.

Similar letters of reference indicate corresponding parts in the several figures.

The nature of my invention consists—

First, in the construction of the yoke of the tree and the terrets or guides for the lines of one piece of metal, thereby obtaining great strength and avoiding the expense and liability to work loose of the old terrets or line-rings.

Second, in the construction of T-shaped heads on the ends of the yoke, adapted to fit into recesses made in the pad-plates, and to form pivotal connections therefor which will not be liable to become detached, as will be hereinafter explained.

Third, in the formation in each pad-plate of a recess to receive a T-shaped head on the yoke, and also to receive a spring, which will keep the said head firmly in place and only allow it to be introduced in its place or removed therefrom when the pad-plate is held out of its normal position or out of line with the yoke, as will be hereinafter explained.

To enable others skilled in the art to understand my invention, I will explain its construction and operation.

In the accompanying drawing—

A represents the yoke, which is produced with terrets or loops, $a\ a$, on opposite sides of its center, and with T-shaped heads, $b\ b$, on its extremities.

The terrets $a\ a$ rise from spaces or openings through the yoke, which are bounded in front and rear by bars, $c\ c$. This affords great strength, combined with lightness and simplicity of construction.

By thus making the yoke and terrets or line-loops $a\ a$ of one piece of metal the labor and expense attending the screw-terrets are avoided, besides, the improved terrets are not so liable to become broken.

Each extremity of the yoke has a T-shaped head formed on it, as shown clearly in fig. 2, the pivotal portions of which extend transversely with respect to the length of the yoke.

These T-shaped extremities $b\ b$ are received into recesses which are formed in the elevated circular portions $e$ on the pad-plates B, as shown in figs. 4, 5, and 6.

When the pad-plates B are connected to the ends of the yoke the former are in line with the latter, and the pivotal portions of the T-shaped heads are at right angles to the length of oblong slots, $ff$, through which these heads are passed in order to enter their receptacles in the raised portions $e$. It will thus be seen that the pad-plates can only be connected to or disconnected from the ends of the yoke when the former are held out of their normal position for use; that is to say, at or nearly at right angles to the length of the yoke.

When the plate B is attached to the yoke the pivotal portions $b$ are received into recesses, $o\ o$, and are held therein by the action of a spring, $s$, and wearing-plate $g$, which are confined in a cup, C, riveted to the bottom of the plate B.

The spring $s$ may be of metal or of rubber. It should be strong enough to keep the end of the yoke firmly up against its bearings $o\ o$ and prevent looseness.

The wearing-plate $g$, which is between the spring $s$ and the T-shaped end $b$, is prevented from turning by little extensions which are formed on it, that are received into recesses, $i\ i$, in the cup C.

It will be seen by reference to fig. 8, (which shows the back of a plate, B, without the cup C,) that on opposite sides of the recesses $o\ o$ beveled surfaces are formed, which allow the pivotal portions $b\ b$ to be readily turned from the slot $f$ and brought into said recesses $o$ during the act of connecting a plate, B, to its yoke.

I am aware that pad-plates have been connected to harness-trees before my invention by pivotal nuts and screw-terrets, but the pivotal nuts were made separate from the yokes or trees, and the pad-plates were prevented from turning out of line by tenons and grooves combined with the terret-fastenings. I do not, therefore, claim such a contrivance as my invention.

Having described my invention,

What I claim as new, and desire to secure by Letters Patent, is—

1. The terrets or rein-loops $a\ a$ and yoke A, formed of one piece of metal, substantially as described.

2. The pad-plate B, formed with a perforated chamber, $e$, and with partitions which form recesses $o$ within said chamber, all in the manner and for the purpose described.

3. The slotted plate $b$, recessed at $o\ o$ to receive a T-shaped head, $b$, in combination with a spring, $s$, inclosed in a cup, C, substantially as described.

JOHN H. MARTIN.

Witnesses:
GEORGE W. DONALDSON,
L. E. WILSON.